Nov. 25, 1969     W. S. METCALF     3,480,884
ELECTROMAGNETIC WAVE ENERGY COUPLING APPARATUS COMPRISING
AN ANISTROPIC DIELECTRIC SLAB
Filed Aug. 26, 1968     3 Sheets-Sheet 1

INVENTOR
WILLIAM S. METCALF
BY Roland D. Griffin
ATTORNEY

Nov. 25, 1969    W. S. METCALF    3,480,884
ELECTROMAGNETIC WAVE ENERGY COUPLING APPARATUS COMPRISING
AN ANISTROPIC DIELECTRIC SLAB
Filed Aug. 26, 1968    3 Sheets-Sheet 2

INVENTOR
WILLIAM S. METCALF
BY Roland D. Griffin
ATTORNEY

INVENTOR
WILLIAM S. METCALF
BY Roland D. Griffin
ATTORNEY

United States Patent Office 3,480,884
Patented Nov. 25, 1969

3,480,884
ELECTROMAGNETIC WAVE ENERGY COUPLING APPARATUS COMPRISING AN ANISOTROPIC DIELECTRIC SLAB
William S. Metcalf, Impington, England, assignor to Hewlett-Packard Company, Palo Alto, Calif., a Corporation of California
Filed Aug. 26, 1968, Ser. No. 755,128
Int. Cl. H01p 5/12
U.S. Cl. 333—6
15 Claims

ABSTRACT OF THE DISCLOSURE

Two parallel line conductors are disposed on a slab of oriented anisotropic dielectric material in a plane between and parallel to a pair of parallel ground plane conductors to provide an electromagnetic wave energy signal coupler having improved electrical properties. The anisotropic dielectric slab is oriented with a greater dielectric constant along a transverse axis perpendicular to the longitudinal axes of the line conductors and parallel to the plane of the ground plane conductors than the dielectric constant along an axis perpendicular to the ground plane conductors.

BACKGROUND OF THE INVENTION

This invention relates to electromagnetic wave energy signal couplers and, more particularly, to devices, such as directional couplers, which utilize natural field coupling between parallel line conductors.

In a conventional electromagnetic wave coupling device, a signal applied to one of a pair of adjacent, parallel, coupled lines placed in a plane near a ground plane conductor is coupled at least in part to the other of the parallel coupled lines due to the natural electric and magnetic field coupling between the parallel conductors. Examples of such coupling devices employing this phenomenon are directional couplers, filters, baluns, mixers, and delay lines.

The effectiveness of the coupling properties in such devices, described for example, in a directional coupler by its isolation or directivity, will depend upon several factors. One of the most important of these factors is the phase relationship between the so-called even and odd mode waves carried by the coupled lines. For theoretical purposes an electromagnetic wave may be considered to be the superposition of these even and odd mode waves. The even mode represents the condition where the line conductors are at the same potential and carry currents in the same direction, and the odd mode represents the condition where the conductors are at equal but opposite potentials and carry currents in opposite directions. If these two modes remain in a fixed phase relation along the parallel, coupled line conductors, power will be smoothly and efficiently transferred in accordance with the design of the coupling device.

However, many coupling devices, especially those fabricated by depositing or etching microstrip line conductors on a dielectric substrate, distort the phase relationship between even and odd mode waves. This distortion is due to the interface of different dielectric constant materials through which the field lines of even and odd mode waves must pass. The resulting out of phase relationship between the even and odd modes lowers the efficiency and degrades the coupling properties of the device. The distorted odd and even mode waves may be considered to propagate along the conductors through the dielectric at different velocities. Thus, near the end of the parallel coupling section the even and odd modes will be slightly out of phase with each other. This mismatch lowers the efficiency of the coupler. In a directional coupler, the directivity and isolation are lowered by such an out-of-phase relationship between odd and even mode waves.

It is therefore the general object of this invention to provide a means of efficiently coupling electromagnetic wave energy from one transmission line to another transmission line by reducing the distortion in the phase velocities of even and odd mode waves along the parallel coupling section. It is a further object of the invention to provide a directional coupler having improved isolation and directivity over a broad frequency range.

SUMMARY OF THE INVENTION

In accordance with one illustrated embodiment of the invention, a directional coupler is provided with a slab of oriented anisotropic dielectric material, such as sapphire, for matching the odd and even mode wave velocities through the coupler.

The slab of anisotropic dielectric material has different dielectric constants along two separate perpendicular axes and is oriented on a ground plane such that the axis of the smaller dielectric constant is perpendicular to the ground plane. Two parallel microstrip line conductors are disposed in transverse electric and magnetic field coupling proximity on the dielectric slab in a plane parallel to the ground plane with the axis of the greater dielectric constant being perpendicular to the longitudinal axes of the parallel conductors and being parallel to the ground plane.

One of the major factors affecting the velocity of propagation of each wave mode of an electromagnetic wave energy signal along the conductors is the dielectric constant through which that wave must travel. The phase velocity of each wave mode is approximately given by the expression, $V = c/\sqrt{\epsilon}$ where $c$ is the velocity of light in free space ($3.00 \times 10^8$ m./s.) and $\epsilon$ is the effective constant of the medium through which the wave mode passes. Therefore a small velocity change will exist between modes seeing apparently different dielectric constants. By designing the coupler and choosing an anisotropic dielectric material oriented to equalize the mode velocities, a phase relationship can be maintained between the modes. Thus by matching the velocity of even and odd modes to maintain this phase relationship between the modes through the coupling portion of the coupler, an efficient coupler having improved coupling properties may be created.

In other cases, it may be desirable that the velocities of the even and odd mode waves through a coupling device, such as a power splitter, be different to provide a different phase relationship between the modes. In such a situation, by selectively orienting an anisotropic dielectric in the opposite orientation from that described above, other improved electrical devices may be designed.

DESCRIPTION OF THE PREFERRED EMBODIMENT

Figure 1:
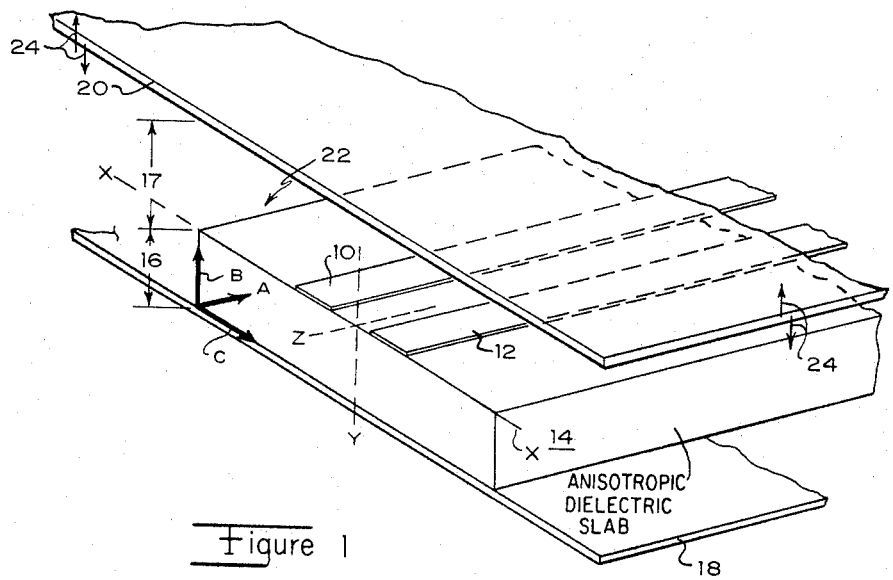
FIGURE 1 is a cross-sectional perspective view of a coupling section, according to one embodiment of the invention, showing the orientation of the anisotropic dielectric material relative to the coupling elements.

Referring now to FIGURE 1, microstrip line conductors 10 and 12 are shown deposited on a dielectric slab 14 of thickness 16. Slab 14 is mounted on a first ground plane conductor 18. Conductors 10 and 12 are maintained parallel to one another on slab 14 in a plane parallel to first ground plane conductor 18. A second ground plane conductor 20 is adjustably mounted parallel to first ground plane conductor 18 a distance 17 above the plane of line conductors 10 and 12. This ground plane 20 may be displaced away from or closer to line conductors 10 and 12 while remaining parallel to ground plane conductor 18. The space above the slab of dielectric 14 below ground plane 20 is filled with an air dielectric 22 having a dielectric constant of unity.

Dielectric slab 14 is not an ordinary isotropic dielectric material but is an oriented anisotropic dielectric having different dielectric constants in different directions through the material. It must have different dielectric constant $\epsilon$ along at least two of its orthogonal axes A, B, and C—such as, for example, along its B and C axes. Thus, the ratio of the dielectric constants along these C and B axes is different than unity. The ratio of the largest dielectric constant, say along axis C, to the smaller dielectric constant, along axis B, may be greater than 1.1 or 1.2 depending on the material selected. It should be noted that these slab axes may be crystalline lattice axes of the dielectric material but they need not be such specific lattice orientations within the dielectric. All that is required is that the dielectric constant in one of two perpendicular directions in the material be different from the constant in the other direction. In actual fact, the dielectric constant of an anisotropic material may vary with the axis selected according to its rotation from a selected direction within the material.

Heretofore in the manufacture of microstrip or strip line coupling components, a substrate has been selected which has isotropic dielectric properties along the X and Y-axes illustrated in FIGURE 1. The present invention recognizes the anisotropic orientation possible and takes advantage of this property to improve the coupling properties of the coupling apparatus.

Dielectric slab 14 is oriented on ground plane conductor 18, as illustrated, with the axis C of the greater dielectric constant parallel to the planes of ground plane conductors 18 and 20 and to the plane of line conductors 10 and 12 and parallel to a transverse axis X normally intersecting line conductors 10 and 12. The slab axis B of the lower dielectric constant is oriented parallel to a Y axis that is perpendicular to the transverse axis X and to ground plane conductors 18 and 20. Thus, the electric field along line conductors 10 and 12 will effectively see a different dielectric constant depending upon which axis C or B, the lines of force of such a field pass through.

Figure 2:
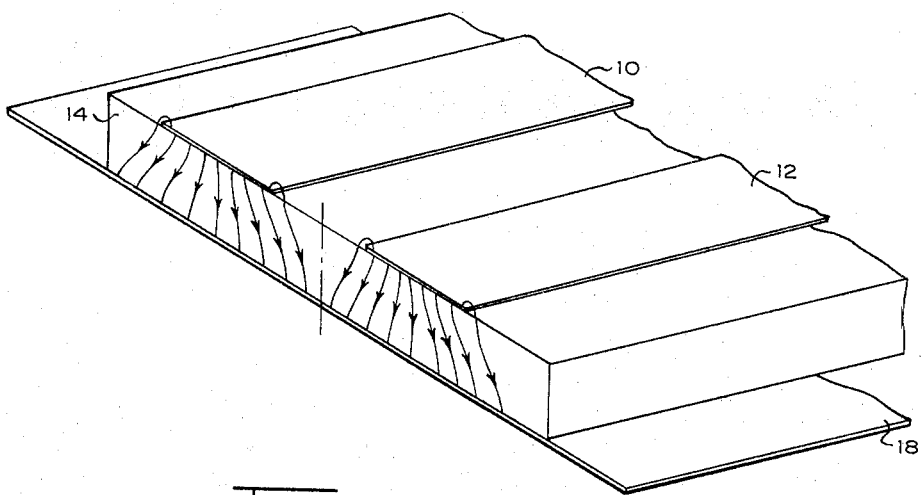
FIGURE 2 is a cross-sectional perspective view showing the theoretical electric field distribution of an even mode wave along a pair of parallel line conductors disposed on a dielectric slab above a ground plane conductor.
Figure 3:
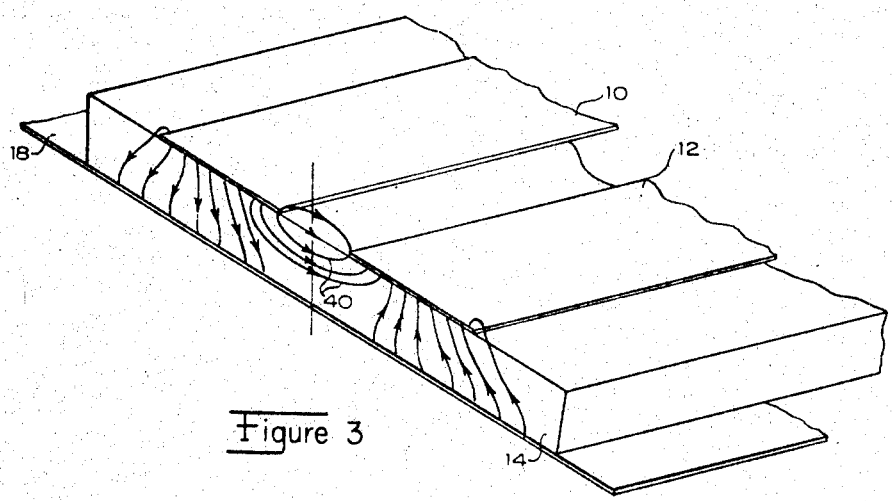
FIGURE 3 is a cross-sectional perspective view showing the theoretical electric field distribution of the odd mode wave along a pair of parallel line conductors disposed on a dielectric slab above a ground plane conductor.

As stated earlier, an electromagnetic wave energy signal applied to a pair of line conductors above a ground plane may be considered as a superposition of two fundamental modes of wave motion, designated the odd and even modes. These modes produce two distinct field distributions as illustrated in FIGURES 2 and 3. The even mode of FIGURE 2 is descriptive of the field distribution when equal currents are flowing in the two line conductors and the odd mode distribution of FIGURE 3 is descriptive of the field distribution when equal and opposite currents are flowing in the two conductors. The isolation and the directivity of a directional coupler are lowered if these two wave modes do not propagate at the same velocity along the conductors. In other coupling device, such as filters, baluns, and power splitters, a difference in the odd and even mode velocities will also degrade the coupling characteristics.

Figure 4:
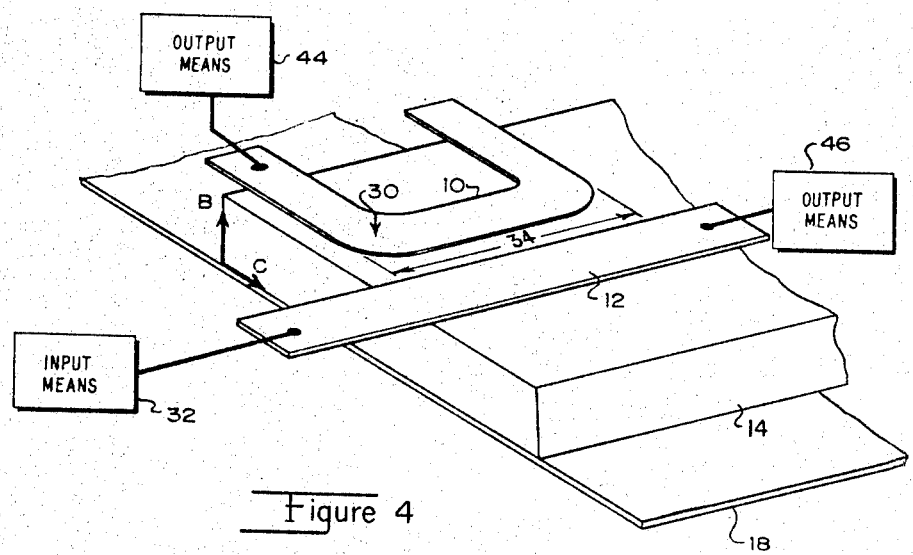
FIGURE 4 is a perspective view of the preferred embodiment of the invention for use as a directional coupler.

Referring now to the preferred embodiment of the invention which is a directional coupler as shown in FIGURE 4, application of an electromagnetic wave input signal to input terminal 32 of line conductor 12 produces output signals at output terminals 44 and 46. Odd and even mode waves are introduced in phase at a point of discontinuity, such as 30. The theoretical odd and even mode electromagnetic waves should propagate along conductors 10 and 12 at the same wave velocity and should therefore remain in phase along the parallel field coupling region 34 of line conductors 10 and 12. However, coupled lines such as microstrip transmission lines deposited on a dielectric slab suffer from the known weakness that the odd and even mode waves normally propagate along the conductors with different velocities due to the interface between the dielectric slab and the dielectric medium (typically air) of much smaller dielectric constant (unity in the case of air), above the plane of the dielectric slab.

Considering the even and odd mode field distributions as shown in FIGURES 2 and 3, it will be noted that field components of these different wave modes travel in generally different directions through the dielectric slab 14 between ground plane 18 and line conductors 10 and 12. In particular, it is seen that the odd mode electric field distribution of FIGURE 3 has lines of force, illustrated as lines 40, running substantially parallel to the ground plane and in a direction substantially perpendicular to the longitudinal axes of the line conductors.

The present invention, provides an oriented anisotropic dielectric slab 14 in the space between line conductors 10 and 12 and the ground plane 18 to improve the coupling properties of the coupler. Since the even and odd mode fields travel through the anisotropic dielectric slab 14 in different directions, the odd mode wave will at least in part see a different dielectric constant than the even mode wave. Since the velocity of either mode equals $c/\sqrt{\ }$, the velocity of the odd mode relative to the velocity of the even mode will be lowered if the effective dielectric constant $\epsilon$ as seen along the X-axis by portions of the odd mode wave is greater than the dielectric constant $\epsilon$ as seen along the Y-axis by the even mode wave. By selectively orienting anisotropic dielectrics having dielectric constants of a ratio that equalizes the velocities of the even and odd modes in this manner, the in-phase relationship of the modes can be maintained throughout the coupling region 34 thereby improving the isolation and directivity of the coupler.

Oriented anisotropic dielectric slab 14 may comprise, for example, a crystalline sapphire slab having a dielectric constant of approximately 9.6 along its A and B axes and a dielectric constant of approximately 12.07 along its C axis. By orienting this sapphire slab, as illustrated in FIGURE 1 with the larger dielectric constant along the transverse X-axis and the smaller dielectric constant along the orthogonal Y-axis, the velocity of the odd mode wave can be reduced to more nearly match the velocity of the even mode wave. Another oriented anisotropic dielectric material that may be used is rutile, which also has a crystalline structure and different dielectric constants along perpendicular axes.

The difference in the velocity of odd and even mode waves propagating along a coupling section above a dielectric substrate may also be corrected by selective placement of a second ground plane conductor 20 above a microstrip coupling section as shown in FIGURE 1. Ordinarily this second ground plane conductor 20 is not employed in a microstrip coupler since it results in a distortion of the field distribution. However, by selectively placing the second ground plane conductor 20 parallel to the plane of microstrip line conductors 10 and 12 and at a selected distance above them, the directivity of a directional coupler or the coupling properties of other types of coupling devices can be improved by equalizing the velocities of the even and odd mode waves along the coupling region 34. The second ground plane conductor 20 may be varied in height 17 above conductors 10 and 12 as indicated by arrows 24.

Referring again to FIGURES 2 and 3, it will be noted that the even and odd mode electric fields have different distributions in the area above the dielectric slab 14. Therefore locating another ground plane conductor in this area tends to distort the even and odd mode field distributions differently. It has been verified experimentally that lowering a parallel ground plane conductor theoretically from infinity into the area above the conductors 10 and 12 will also tend to equalize the velocities of the odd and even modes along the conductors through the coupling region by increasing the even mode wave velocity more than the odd mode wave velocity (the two velocities approaching the same velocity). With an isotropic dielectric substrate (not shown), the odd and even mode velocities would approach a theoretical limit where they are substantially equal when the distance of both ground planes 18 and 20 from the line conductors are substantially equal. For anisotropic dielectrics such as sapphire, oriented as in FIGURE 1, ground plane 20 should be spaced a greater distance above conductors 10 and 12 than ground plane 18 is spaced below them to match the even and odd mode wave velocities. Thus adjustments of the height 17 of ground plane 20 may be used as a method of fine tuning to equalize even and odd mode velocitiecs and increase the efficiency of the coupler.

Figure 5:
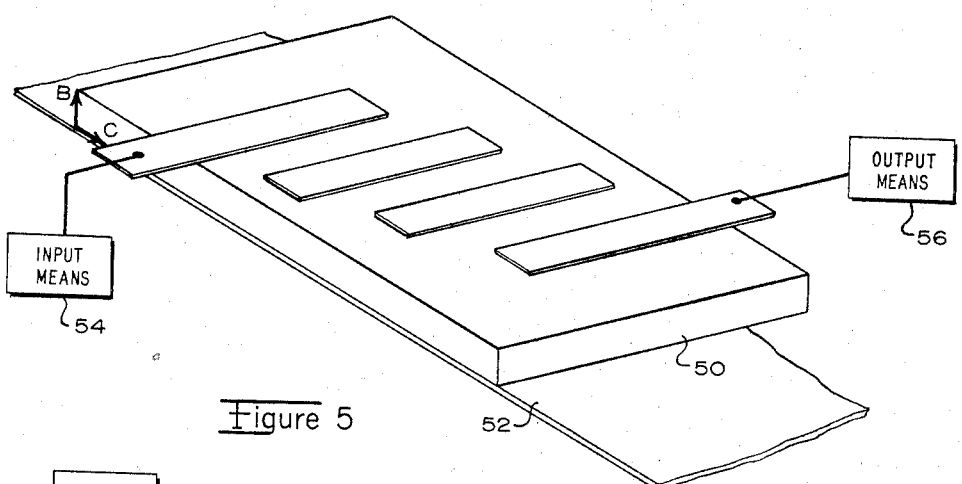
FIGURE 5 is a perspective view of an alternative embodiment of the invention for use as a directional coupler.

Referring now to FIGURE 5, an improved electromagnetic wave filter can be provided by placing three or more parallel transmission lines in series on an oriented anisotropic dielectric slab 50 above a ground plane conductor 52. An input signal applied to input terminal 54 is efficiently coupled to an output terminal at 56 by the use of anisotropic dielectric slab 50 in the orientation described above to match odd and even mode wave velocities. Thus, dielectric slab 50 is oriented with its C-axis of larger dielectric constant perpendicular to the longitudinal axes of the parallel line conductors and parallel to ground plane conductor 52. The resultant matching of the even and odd mode wave velocities improves the band defining characteristics of high pass, low pass, band stop, or band pass filters. Similarly, other coupling devices, such as baluns for the transmission of energy from an unbalanced transmission line to a balanced line, may be constructed in accordance with the present invention, to improve the coupling of such devices by matching the odd and even mode wave velocities.

Figure 6:
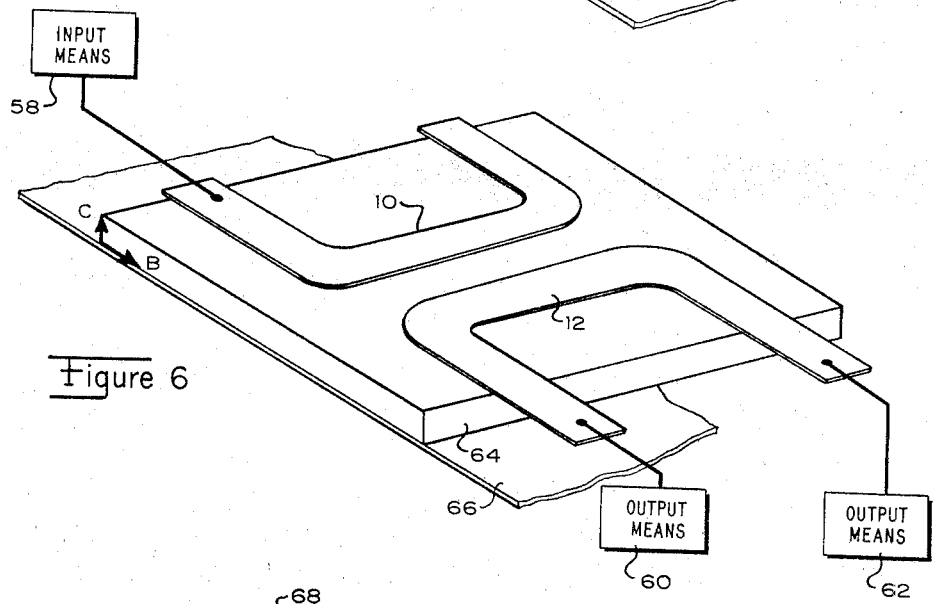
FIGURE 6 is a perspective view of an alternative embodiment of the invention for use as a power splitter.
Figure 7:
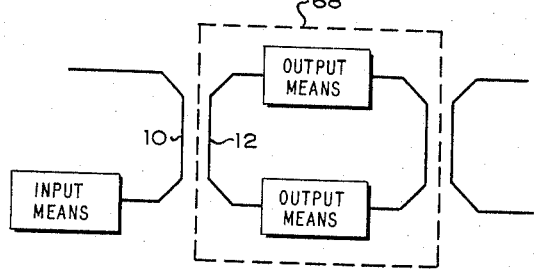
FIGURE 7 is a schematic diagram showing a tandem arrangement of two power splitters such as the one shown in FIGURE 6.

Up to this point the invention has been concerned with the selective matching of odd and even mode wave velocities to improve the coupling properties of electromagnetic wave energy coupling devices. It should also be noted that there may be times when mismatching the odd and even mode velocities is desirable and can be accomplished using an oriented anisotropic dielectric. Referring, for example, to FIGURE 6, a power splitter is shown that takes advantage of selective mismatching of the odd and even mode wave velocities. In response to application of an input signal to input terminal 58 of transmission path 10, output signals are supplied in two directions along transmission path 12 to output terminals 60 and 62 due to selective mismatch of the velocities of odd and even mode waves along the parallel coupling portions of line conductors 10 and 12. Anisotropic dielectric slab 64 is oriented with its C-axis of greater dielectric constant perpendicular to ground plane conductor 66 and with its B-axis of lesser dielectric constant perpendicular to the longitudinal axes of line conductors 10 and 12 and parallel to ground plane conductor 66. The mismatch of odd and even mode wave velocities transfers most of the energy in transmission path 10 to transmission path 12, thereby splitting the power in two output directions for reception at terminals 60 and 62. Two of these power splitters may be arranged in tandem, as shown schematically in FIGURE 7, to provide a network, indicated within dashed block 68, that is entirely direct current isolated. This could not be accomplished using two directional couplers.

I claim:
1. Signal coupling apparatus comprising:
first and second electromagnetic wave energy transmission paths including a first reference conductor and first and second line conductors;
said first and second line conductors including coupling portions in transverse electric and magnetic field coupling proximity with a finite spacing therebetween;
said line conductors having a transverse axis intersecting the coupling portion of each line conductor and another axis perpendicular to said transverse axis and intersecting said reference conductor;
a slab of dielectric material having a first dielectric constant along a first axis and having a second and different dielectric constant along a second axis substantially perpendicular to said first axis;
said slab being disposed between said line conductor coupling portions and said reference conductor and being oriented with said first axis parallel to said transverse axis and said second axis parallel to said other axis.
2. Signal coupling apparatus as in claim 1 wherein:
said first reference conductor is a ground plane conductor;
said coupling portions of the line conductors are disposed in a plane above said first reference conductor; and
said other axis is substantially perpendicular to said ground plane conductor.
3. Apparatus as in claim 2 wherein said line conductors are microstrip lines disposed on said slap of dielectric material.
4. Apparatus as in claim 2 wherein said dielectric material comprises one of oriented sapphire and rutile.
5. Signal coupling apparatus as in claim 2 wherein the ratio of said first dielectric constant to said second dielectric constant is greater than unity.
6. Signal coupling apparatus as in claim 5 wherein said ratio is greater than 1.1.
7. Signal coupling apparatus as in claim 5 wherein said ratio is greater than 1.2.
8. Apparatus as in claim 3:
including input means coupled to one of said transmission paths for receiving an input electromagnetic wave energy signal;
including output means coupled to one or more of said transmission paths for receiving an output signal;
wherein said coupling apparatus directionally couples said input signal to said output means; and
wherein said ratio is selected to improve the directivity of said coupling apparatus.
9. Apparatus as in claim 2 wherein said coupling portions are disposed in a plane a first selected distance above said first planar reference conductor and in plane parallel relationship thereto.
10. Signal coupling apparatus as in claim 9 including a second ground plane conductor disposed a second selected distance above the plane of said line conductors and in plane parallel relationship therewith.
11. Apparatus as in claim 10 including means for adjusting said second distance of said second ground plane conductor above said line conductors.
12. Apparatus as in claim 3 wherein said line conductor coupling portions are parallel.

13. Apparatus as in claim 12:
including input means coupled to one of said transmission paths for receiving an input electromagnetic wave energy signal;
including a third line conductor disposed a finite distance from said first and second line conductors in transverse electric and magnetic field coupling proximity therewith;
including output means coupled to the other of said transmission paths for receiving an output signal which is a filtered representation of said input signal; and
wherein said ratio is selected to improve the band defining characteristics of said coupling apparatus.

14. Apparatus as in claim 2 wherein the ratio of said first dielectric constant to said second dielectric constant is less than unity.

15. Apparatus as in claim 14 for providing a power splitter:
including input means coupled to one of said transmission paths for receiving an input electromagnetic wave energy signal; and
including output means coupled to the other of said transmission paths for receiving at least one output signal.

References Cited

UNITED STATES PATENTS 3,237,130   2/1966   Cohn _____ 333—10

HERMAN KARL SAALBACH, Primary Examiner

PAUL L. GENSLER, Assistant Examiner

U.S. Cl. X.R.

333—10, 73, 84

UNITED STATES PATENT OFFICE
CERTIFICATE OF CORRECTION

Patent No. 3,480,884                            November 25, 1969

William S. Metcalf

It is certified that error appears in the above identified patent and that said Letters Patent are hereby corrected as shown below:

Column 2, line 38, after "effective" insert -- dielectric --. Column 3, line 4, cancel "directional coupler" and insert -- microwave filter --. Column 4, line 43, "$c/\sqrt{\phantom{x}}$" should read -- $c/\sqrt{\varepsilon}$ --. Column 5, line 25, "distance" should read -- distances --.

Signed and sealed this 20th day of October 1970.

(SEAL)
Attest:

Edward M. Fletcher, Jr.                      WILLIAM E. SCHUYLER, JR.
Attesting Officer                                  Commissioner of Patents